(12) United States Patent
Fu et al.

(10) Patent No.: US 11,950,609 B2
(45) Date of Patent: Apr. 9, 2024

(54) LOW MOISTURE FEED BLOCK WITH COLD FLOW RESISTANCE

(71) Applicant: RIDLEY USA INC., Mankato, MN (US)

(72) Inventors: Chunjiang Fu, North Mankato, MN (US); Dan Dhuyvetter, St. Peter, MN (US)

(73) Assignee: RIDLEY USA INC., Mankato, MN (US)

( * ) Notice: Subject to any disclaimer, the term of this patent is extended or adjusted under 35 U.S.C. 154(b) by 415 days.

(21) Appl. No.: 17/062,872

(22) Filed: Oct. 5, 2020

(65) Prior Publication Data

US 2021/0084937 A1 Mar. 25, 2021

Related U.S. Application Data

(62) Division of application No. 13/838,089, filed on Mar. 15, 2013, now Pat. No. 10,813,374.

(51) Int. Cl.
| | | |
|---|---|---|
| *A23K 10/40* | (2016.01) | |
| *A23K 10/33* | (2016.01) | |
| *A23K 20/163* | (2016.01) | |
| *A23K 20/20* | (2016.01) | |
| *A23K 20/24* | (2016.01) | |
| *A23K 40/20* | (2016.01) | |
| *A23K 50/10* | (2016.01) | |

(52) U.S. Cl.
CPC ............. *A23K 10/40* (2016.05); *A23K 10/33* (2016.05); *A23K 20/163* (2016.05); *A23K 20/20* (2016.05); *A23K 20/24* (2016.05); *A23K 40/20* (2016.05); *A23K 50/10* (2016.05); *Y02P 60/87* (2015.11)

(58) Field of Classification Search
CPC ...... A23K 10/40; A23K 10/33; A23K 20/163; A23K 20/20; A23K 20/24; A23K 40/20; A23K 50/10; Y02P 60/87
USPC ........................................................ 426/74
See application file for complete search history.

(56) References Cited

U.S. PATENT DOCUMENTS

| | | |
|---|---|---|
| 1,983,434 A | 12/1934 | Black et al. |
| 3,532,503 A | 10/1970 | Kviesitis |
| 3,961,081 A | 6/1976 | McKenzie |
| 4,016,296 A | 4/1977 | DeSantis |
| 4,027,043 A | 5/1977 | Schroeder |
| 4,160,041 A | 7/1979 | Schroeder et al. |
| 4,171,385 A | 10/1979 | Skoch et al. |
| 4,234,608 A | 11/1980 | Linehan |
| 4,431,675 A | 2/1984 | Schroeder et al. |
| RE31,804 E | 1/1985 | Skoch et al. |
| 4,631,192 A * | 12/1986 | Mommer .............. A23K 20/24 426/519 |
| 4,749,578 A | 6/1988 | Benton et al. |
| 4,775,539 A | 10/1988 | Van de Walle |
| 4,803,085 A | 2/1989 | Findley |
| 4,957,769 A | 9/1990 | Theuninck et al. |
| 4,994,282 A | 2/1991 | Miller |
| 4,996,065 A | 2/1991 | Van de Walle |
| 5,068,114 A | 11/1991 | Chanen et al. |
| 5,078,388 A | 1/1992 | Dempsey, Jr. |
| 5,236,717 A | 8/1993 | Vinci |
| 5,935,626 A | 8/1999 | Moeching et al. |
| 6,168,803 B1 | 1/2001 | Harris |
| 6,337,097 B1 | 1/2002 | Sun et al. |
| 6,561,787 B2 | 5/2003 | Sun et al. |
| 6,726,941 B2 | 4/2004 | Ethington, Jr. et al. |
| 6,793,947 B2 | 9/2004 | Bachmeier |
| 7,045,165 B2 | 5/2006 | Westberg |
| 7,098,352 B2 | 8/2006 | Strohmaier et al. |
| 7,718,187 B2 | 5/2010 | Robbins et al. |
| 10,813,374 B2 | 10/2020 | Fu |
| 2003/0118690 A1 | 6/2003 | Bartle |
| 2004/0009209 A1 | 1/2004 | Robbins |
| 2005/0008759 A1 | 1/2005 | Nie |
| 2009/0220638 A1 | 9/2009 | Pablos Perez |

FOREIGN PATENT DOCUMENTS

| | | |
|---|---|---|
| AU | 4617896 | 9/1996 |
| EP | 0231079 | 8/1987 |
| WO | WO 96/25055 | 8/1996 |
| WO | WO 01/01790 | 1/2001 |

OTHER PUBLICATIONS

Google search report retrieved on Dec. 14, 2022 (It provide the new prior art by Mommer et al. USPN 4631192 as recorded in this 892 form under US patent Documents above). (Year: 2022).*
International Search Report dated Aug. 3, 1999 for PCT/AU99/00541, submitted as part of WO2001001790A1.
Merwe et al. in Journal of Thermal Analysis and Calorimetry, 2006, vol. 84 467-71.

* cited by examiner

*Primary Examiner* — Donald R Spamer
*Assistant Examiner* — Bhaskar Mukhopadhyay
(74) *Attorney, Agent, or Firm* — Barnes & Thornburg LLP

(57) ABSTRACT

A method of forming a low moisture block with cold flow resistance proceeds by subjecting a feed mixture containing molasses-like liquids to mixing to form a homogenous mixture; dehydrating the molasses-like mixture to less than about 2.0% moisture using heating; adding to the dehydrated molasses-like liquid mixture one or more feed ingredients in dry ingredient form, comprising 10% to 50% by weight of the resulting mixture; and adding to the dehydrated molasses-like mixture a composition comprising CaO or reactive MgO or combinations thereof, with the composition comprising 0.1% to 10% by weight of the resulting mixture. The composition is mixed in to form a homogenous mixture.

20 Claims, 10 Drawing Sheets

FIG. 2

Measure molasses and any fat, e.g., HVO, into cooker

↓

Stir and heat molasses and fat in cooker, heating the mixture to about 300°F (150°C) and applying vacuum, to dehydrate until a moisture level of about 2% or less is obtained

↓

Add dry ingredients to dehydrated molasses mixture.

↓

Add a composition comprising at least one of CaO, reactive MgO, ZnO, MnO, FeO, CuO, $CuO_2$ or combinations thereof, just before, with or just following adding dry ingredients

↓

Mix dry ingredients and the composition into dehydrated molasses mixture.

↓

Pour mixture of dry ingredients, the composition, and dehydrated molasses mixture into containers or molds

↓

Material in containers cooled. After cooling any material placed in molds, remove solidified blocks from molds.

↓

Low moisture blocks with and without containers are ready to deploy.

Fig. 3C
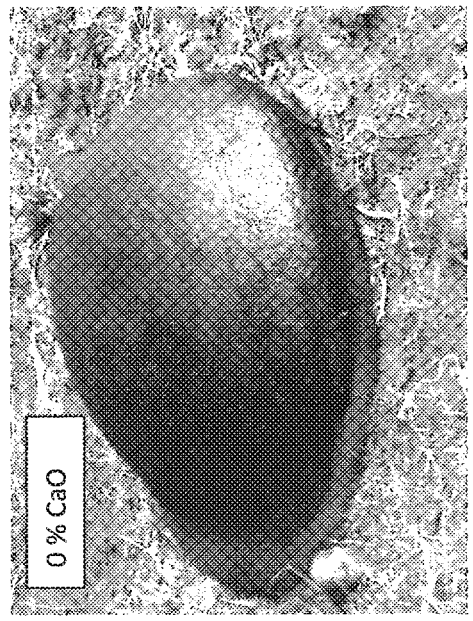

FIG. 5

The effects of different chemicals on cold flow of cane molasses blocks

| Chemicals | 0H Height (CM) | 0H Height (%) | 2H Height (CM) | 2H Height (%) | 3H Height (CM) | 3H Height (%) | 4H Height (CM) | 4H Height (%) |
|---|---|---|---|---|---|---|---|---|
| 1.5%CaO | 7.5 | 100.0 | 4.8 | 64.0 | 3.6 | 48.0 | 2.9 | 38.7 |
| 1.5%Ca(OH)$_2$ | 7.2 | 100.0 | 3.8 | 52.8 | 2.5 | 34.7 | 2.0 | 27.8 |
| 1.5%MgSO$_4$ | 7.3 | 100.0 | 3.9 | 53.4 | 2.5 | 34.2 | 1.6 | 21.9 |
| 1.5%Na$_2$SO$_4$ | 7.3 | 100.0 | 3.7 | 50.7 | 2.3 | 31.5 | 1.4 | 19.2 |
| 1.5%CaSO$_4$ | 7.3 | 100.0 | 3.0 | 41.1 | 1.6 | 21.9 | 1.1 | 15.1 |
| 1.5%R-MgO | 7.3 | 100.0 | 4.4 | 60.3 | 3.3 | 45.2 | 2.3 | 31.5 |
| 1.5%CaCl$_2$ | 7.2 | 100.0 | 3.8 | 52.8 | 2.6 | 36.1 | 2.0 | 27.8 |
| 1.5%MgCl$_2$ | 7.3 | 100.0 | 3.6 | 49.3 | 2.0 | 27.4 | 1.5 | 20.5 |
| 1.5%CaCO$_3$ | 7.4 | 100.0 | 3.7 | 50.0 | 2.5 | 33.8 | 1.4 | 18.9 |
| Control | 7.5 | 100.0 | 3.6 | 48.0 | 2.3 | 30.7 | 1.6 | 21.3 |

LOW MOISTURE FEED BLOCK WITH COLD FLOW RESISTANCE

CROSS-REFERENCE TO RELATED APPLICATIONS

This application is a divisional application of U.S. patent application Ser. No. 13/838,089, filed on Mar. 15, 2013, the disclosure of which is expressly incorporated by reference herein.

FIELD OF THE INVENTION

The present invention relates to low moisture blocks used to deliver feed supplements and other ingestible substances to animals.

BACKGROUND OF THE INVENTION

Low moisture feed blocks for animals made by dehydrating molasses and adding special nutritional elements and other ingredients have become widely used. Such blocks are generally highly palatable and thus attract animals, permitting them to serve as a delivery vehicle for feed supplements or other feed elements provided on an ad libitum consumption basis. They also have a consumption limiting feature, in that they generally must be consumed by licking, rather than in bites, which slows ingestion. The combination of attraction and slow consumption also helps to hold grazing animals in locations near the blocks. See, e.g., U.S. Pat. Nos. 6,244,217; 6,390,024 and 6,561,133.

As a result of these qualities, low moisture blocks have become widely used in many animal feed situations with many different ingredient formulations. However, it has been noted, particularly in warmer climates, that low moisture blocks tend to exhibit cold flow properties. That is, although they are for most purposes a solid, relatively hard mass, stable in shape and able to withstand rain, at warmer ambient temperatures gravity causes them to tend to slump slowly. When the block material is within an upright container (as is usually the case), and it simply slumps to conform further to the container, the cold flow has little or no noticeable effect. However, if a low moisture block container is tipped or torn (as can happen when large animals interact with it) or if it is biodegradable and partially breaks down or if the block is deployed without a container, the cold flow property will cause the block material to slump into a flattened pile or puddle within about 48 hours of exposure to an air temperature, or direct sunlight causing a block surface temperature, over 85 degrees F., which is typical in summer time of many parts of the U.S. The block behaves like water seeking its own level, albeit so slowly the slumping seems imperceptible. For situations where the low moisture block is to be consumed over a longer period and slumping will occur to an undesirable degree before complete consumption, resistance to cold flow would be highly desirable.

BRIEF SUMMARY OF THE DISCLOSURE

This discloses a method for forming a low moisture block with cold flow resistance. The method comprises subjecting a feed mixture containing molasses-like liquids to mixing to form a homogenous mixture; dehydrating the molasses-like mixture to less than about 2.0% moisture using heating; adding to the dehydrated molasses-like liquid mixture one or more feed ingredients in dry ingredient form, comprising 10% to 50% by weight of the resulting mixture; adding to the dehydrated molasses-like mixture a composition comprising at least one of CaO, reactive MgO, ZnO, MnO, FeO, CuO, $CuO_2$ or combinations thereof, with the composition comprising 0.1% to 10% by weight of the resulting mixture; and mixing in the composition to form a homogenous mixture.

This discloses a low moisture block formulation with resistance to cold flow comprising a molasses-like mixture dehydrated to less than 2% by weight water; dry feed ingredients, mixed with the dehydrated molasses-like mixture and comprising 10% to 50% by weight of the resulting mixture of dehydrated molasses-like mixture and dry ingredients; and a composition comprising at least one of CaO, reactive MgO, ZnO, MnO, FeO, CuO, $CuO_2$ or combinations thereof, mixed with the dehydrated molasses-like mixture, wherein the composition comprises 0.1% to 10.0% by weight of the resulting mixture of molasses and dry ingredients.

DESCRIPTION OF DRAWINGS

FIG. 2 is a high-level flowchart of a process for making a low moisture block with a composition such as calcium oxide (CaO), reactive MgO, ZnO, MnO, FeO, CuO, $CuO_2$ or combinations thereof added to resist cold flow.

FIG. 3C shows low moisture blocks with and without added CaO and with no container, showing the results of cold flow.

FIG. 5 is a table showing the reduction of slump in cane molasses low moisture blocks to which 1.5% by weight of CaO and eight other possible cold flow affecting agents have been added, relative to a control block to which no cold flow affecting agent has been added.

DETAILED DESCRIPTION

Figure 1:
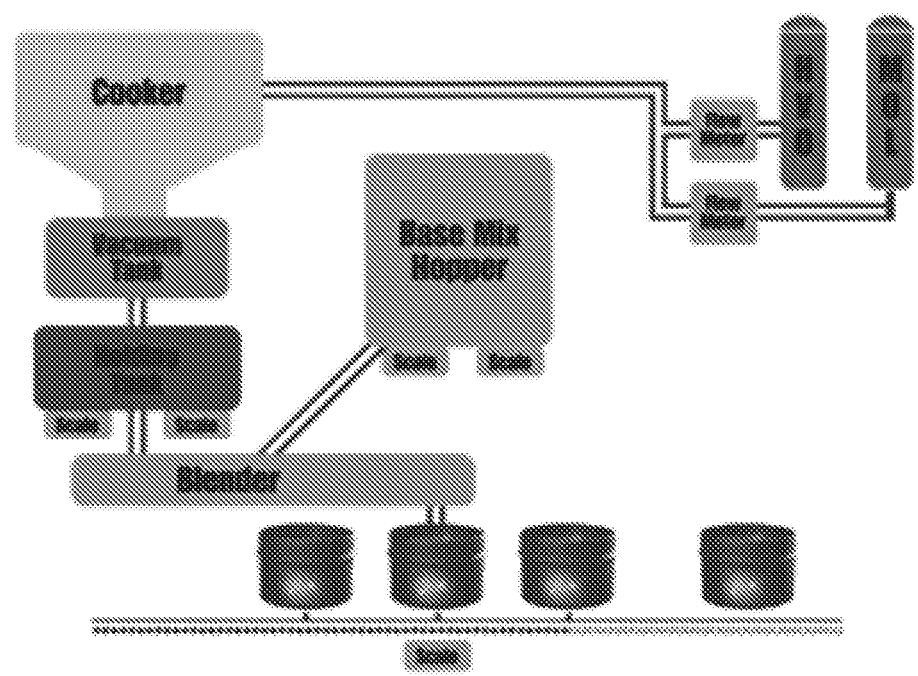
FIG. 1 shows a prior art method of making a low moisture block.

Feed supplement blocks. Feed blocks are currently made primarily by three methods and classified by these methods:

1. Poured/chemical blocks, which are made by hardening the combined ingredients of the product with chemical reactions between water and mineral oxides. Examples of such blocks are found in U.S. Pat. No. 4,016,296 (DeSantis), U.S. Pat. No. 4,027,043 (Schroeder), U.S. Pat. No. 5,236,717 (Vinci), U.S. Pat. No. 6,726,941, (Ethington, Jr. et al.) and U.S. Pat. No. 6,793,947 (Bachmeier). The reactions used to cause hardening vary. DeSantis speaks of using water binding agents, such as calcium sulfate hemihydrate, calcium chloride and mixtures thereof. DeSantis also discusses a hard soap which is formed in situ by the reaction of a hard metallic soap former with a fatty acid soap former, citing as hard metallic soap formers calcium oxide, sodium hydroxide and mixtures thereof. DeSantis describes making a block by mixing molasses and water absorbent clay in a high speed shearing action to form a dispersion, in which the water absorbent clay absorbs and binds from about 5 to 10 times its weight in water from the molasses. The dispersion is then mixed with the water binding agent, the hard metallic soap former, the fatty acid soap former, special purpose additives and some other nutrients. DeSantis mentions adding the soap formers last so as to reduce the quantity of soap formed, which (per DeSantis) is difficult to digest by ruminants, for which block form feeds are often used.

Schroeder describes "an animal feed supplement which contains a major proportion of molasses and solidifying components of a phosphate or phosphoric acid and a metal oxide or salt in sufficient quantities and proportions to solidify the product." Per Schroeder, "the composition also contains an edible fat or oil and a fat emulsifying agent to prevent separation of the fat or oil from the solid composition. Most preferably, starch is employed as the fat emulsifying agent since the starch enhances solidification of the composition." Schroeder states that the metal ingredients that can be employed are aluminum, calcium or magnesium oxides or salts. Of these, calcium is the preferred and calcium oxide and/or gypsum are most preferred. Schroeder acknowledges that the exact nature of the reaction is not known but suggests "there may be a reaction product formed by a partial neutralization of the phosphoric acid or by a metathesis reaction between soluble phosphates and metal additives".

2. Pressed blocks are made by blending ingredients, conditioning them, and placing them under pressure and heat with a binding agent to attain hardness. Examples of such blocks are found in U.S. Pat. No. 3,532,503 (Kviesitis). Kviesitis describes making a block by mixing molasses with a non-absorbent carrier material that is then dried. A surface active emulsion is then mixed with the dry material and the mixture is steamed and pressed into blocks. U.S. Pat. No. 6,168,803 (Harris) also describes a pressed block, but it is more of a hybrid of a chemical block and pressed block. Harris' abstract describes the method as follows: "A process for preparing animal feed blocks requiring minimum physical compression which consists of adding an aqueous feed mixture to dry or semi-moist nutritive ingredients and at least one alkaline earth metal oxide. The resulting non-pourable and non-pumpable mixture is then transferred to a receiver, such as a mold, and subjected to compression." (Alkaline earth metals include: beryllium, magnesium, calcium, strontium, barium and radium.)

3. Low-moisture blocks are made by dehydration of the base ingredient, usually a molasses or molasses derivative, through thermal evaporation. Here too, there are hybrids, which may be formulated to achieve a particular physical objective. U.S. Pat. No. 4,749,578 (Benton et al.) discusses making an improvement over a prior molasses-based block that had a tendency to swell during manufacturing, developing a porous structure, and, when deployed, to soften and become sticky and hard to handle from absorbing atmospheric moisture. The process for making the Benton et al. block is described as follows:

The water resistant, non-porous, hard, vitreous feed block of the present invention is generally made by the following method. A fluid feed composition is provided comprising molasses, about 1% to 2% by weight of unsaturated free fatty acids, and an amount of bivalent base sufficient to saponify said fatty acids into an insoluble soap to enhance the water resistance of the feed block. The fluid feed composition may also comprise a nutritionally compatible acid or base in an amount sufficient to maintain the pH of said composition between about 6.2 to about 6.8 to reduce the swelling of the feed block, and about 1% to about 2% by weight of lecithin to reduce the stickiness of the composition. All weight percents expressed herein are of the total fluid feed composition.

After the fluid feed composition has been thorough mixed, it is heated at ambient pressures to a temperature within a range from about 225° F. to about 300° F. to drive off most of the water content of the molasses and other ingredients. Thereafter, the fluid feed composition is subjected to a vacuum without any further heating to remove any additional water remaining in the fluid feed composition.

Following the vacuum step, about 18% to about 30% by weight of a dry meal flour is admixed with the hot fluid feed composition to provide additional nutritional values, and to reduce the swelling of the feed block by reducing its temperature. The feed composition is then formed into feed blocks and allowed to harden.

Thus, Benton demonstrates that in a low-moisture block the technique of saponification used in the cooking step for poured/chemical blocks can be used. However, for the addition of calcium hydroxide (hydrated lime) to saponify the free fatty acids, Benton reports that only about 1.65% by total mixture weight may be added, because greater concentrations cause the mixture to fume and bubble. Benton appears to use saponification for forming an insoluble soap to enhance the water resistance of the feed block and to perform that saponification before dehydration and does not mention cold flow. Benton also teaches adding an anhydrous salt to further reduce the water content of the feed block by forming a crystalline complex with any water remaining in said composition after vacuum distillation. The anhydrous salts Benton suggests comprise sodium sulfate, magnesium sulfate, calcium chloride, and any other anhydrous salt which is nutritionally compatible with the feed block.

Forming low moisture blocks with cold flow resistance. FIG. 1 shows a current method for making low-moisture blocks that achieve solid form by water removal from the molasses that is a major constituent, rather than by saponification or other chemical reaction during the main mixing process. Thus, the primary step in hardening blocks with this process is dehydration. This dehydration process occurs by application of heat (between 250° F. and 300 F (120° C. and 150° C.)) and vacuum. The low-moisture blocks are manufactured in a precisely controlled process that cooks beet or cane molasses products and fat (hydrolyzed vegetable oil or HVO), reducing the moisture content in these ingredients to less than about two percent. The dehydrated molasses and fat is then blended with "dry" ingredients, which may include proteins, macro-minerals, vitamins, trace minerals and other supplements. The resulting product is placed in shallow steel barrels, plastic containers, biodegradable containers or other containers. As the product cools, the sugars in the molasses solidify to form a consistently hard block that will not crack or crumble and that can't easily be bitten, chewed, or over-consumed. The blocks are largely impervious to the elements; so for blocks placed in grazing situations, there is no wasted supplement due to wind, rain or snow. However, as noted, such blocks exhibit cold flow or creep, which can lead to waste in cases of container tipping or breaking.

The present disclosure shows a method for making a low-moisture feed block that has less cold flow and formulations of such a block. Blocks with resistance to cold flow can reduce losses that may occur when a container of low moisture material is broken or tipped. Resistance to cold flow also permits wider use of biodegradable containers, which stand longer when filled with the cold flow resistant material, particularly if damaged. The biodegradable containers eliminate waste and the effort of collecting and recycling the typical large plastic or steel containers when empty. In some applications cold flow resistance means that a container need not be used when the block is deployed. Thus, with a low-moisture block resistant to cold flow, both use of biodegradable containers and elimination of containers are possible, resulting in an environmental benefit.

Resistance to the cold flow that appears inherent in most low moisture blocks has been found to occur from the addition of CaO to the dehydrated molasses base mixture just before, during or shortly after the dry materials are added to the dehydrated base mixture. In particular, it has been found that adding about 0.5% to 8% CaO by weight of the final product significantly reduces cold flow. Although up to 10% CaO is possible and cold flow resistance continues to be achieved, the higher CaO percentage may become uneconomic, depending on ingredient costs, and also may throw a nutritional plan out of balance, depending on the feed application. Similarly, useful cold flow resistance effects can be expected with CaO present at rates as low as 0.1% by weight. Thus, inclusion of 0.1 to 10% CaO by weight is a desired range, at least for those feeding situations where the extreme ends of these ranges do not, for the particular animals that consume the block, pose nutritional issues.

FIG. 2 shows a flow chart of a method for adding CaO (or a similar composition that reduces cold flow) in a process for forming a low moisture block. The CaO (or similar composition) is added only after moisture has been almost completely removed from the molasses base mixture by dehydration (heating and vacuum). The CaO (or similar composition) is added to the dehydrated molasses-like mixture when it is at a temperature in the range of 145° F. (63° C.) to 180° F. (82° C.), before sugar crystallization occurs.

Typically, after the dehydration step the moisture level of the molasses mixture is less than about 2% by total weight of the mixture coming out of the dehydration step. For example, an initial mixture with 20%-30% moisture may be dehydrated to less than 2% moisture. The CaO (or similar composition) is added during the addition of dry ingredients or just before or after they are added. The dry ingredients typically comprise protein meals, micro or macro minerals, vitamins, essential oils, medications or other feed additives. Although the dry ingredients bear that name (as a contrast to the liquid molasses), they may have a moisture content in the range of 5% to 14% of their weight. Thus, depending on how much of the block mixture is dry ingredients, which may be 5% to 50%, or 10% to 50% of the weight of the total mixture after their addition, some increase in moisture content of the dehydrated molasses-base mixture relative to its moisture content after dehydration may occur with their addition.

Figure 3A:
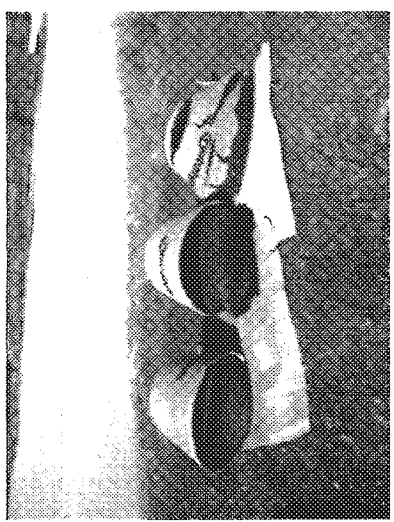
FIGS. 3A and 3B shows low moisture block material in tipped containers and the results of cold flow with two levels of added CaO and with no CaO.
Figure 3B:
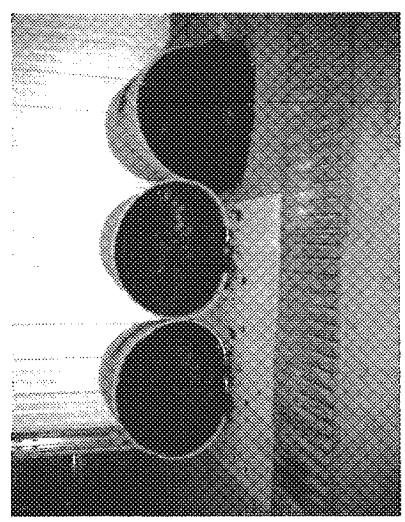

FIGS. 3A, 3B show a time sequence of photographs of two sets of low moisture block test samples taken from production batches. The block composition was 35% dry ingredients added to a liquid with 3%-5% HVO and the balance being molasses. The first sample set is in the top row (FIG. 3A); the second set is in the row below (FIG. 3B). In each set there are two samples prepared with the preceding process, one with 1.5% and the second with 0.75% CaO by weight of the total mixture after their addition. Each set also includes a control block with 0% CaO. The percentages of CaO are marked on the various samples in the first frame of FIGS. 3A and 3B. These samples were prepared by filling the containers in an upright position. The cooled containers were then tipped, as shown, and remained in an outdoor (top row) and an indoor (bottom row) environment in August with ambient temperatures of 60 to 90 degrees F. Pictures were taken at the start (time of tipping) and at 5 and 96 hours after the start.

As can be seen in FIGS. 3A, 3B, the least cold flow appears with the 1.5% CaO sample, and the cold flow is significant after 96 hours for the 0% CaO sample. The condition of the 0% CaO sample suggests that block product with severe slump may be wasted by ground exposure and that the usual consumption control may be lost, because animals may be able to bite off protrusions of the creeping material. If a block maintains its integrity in a container, the animal only has access to the top surface of the material in the container and must lick, rather than bite, it. Maintaining block integrity maintains consumption control.

FIG. 3C shows a comparison of the condition of two low moisture blocks with no supporting container. Both photos were taken after the block spent two days in a Texas pasture outdoor environment with 55 to 85 degrees F. The top photo shows a low moisture block to which CaO was added after molasses mix dehydration, to reach 1.5% CaO by weight. The bottom photo shows a low moisture block to which no CaO was added. The low moisture block to which no CaO was added shows significant slumping after two days. This falls short of the more typical desired block life of ten to twenty-one days, depending on feed application.

Figure 4A:
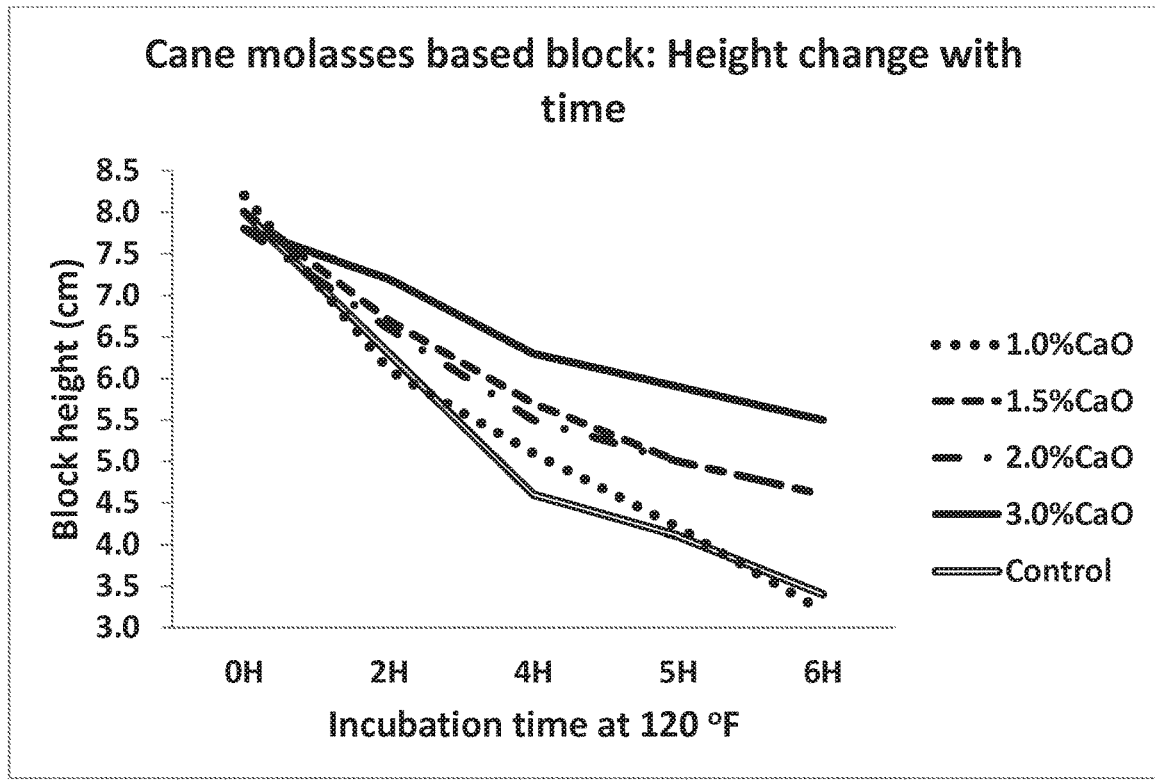
FIGS. 4A-4D are graphs showing the reduction of slump in cane and beet molasses low moisture blocks to which various percentages of CaO have been added, relative to low moisture blocks to which no CaO has been added.
Figure 4B:
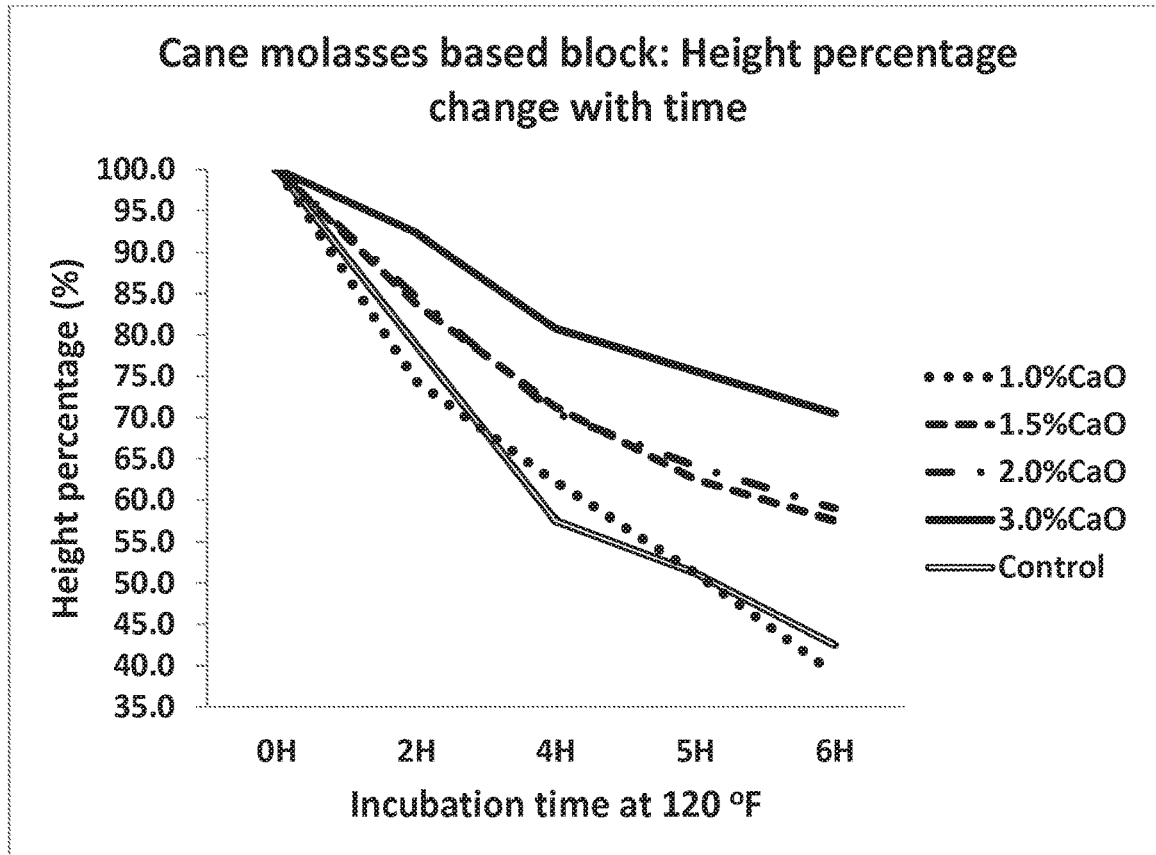

FIGS. 4A and 4B show further, quantitative test results for other batches of low moisture blocks to which CaO was added, in percentages of 1%, 1.5%, 2% and 3% of final product weight and a control low moisture block to which no CaO was added. Again, the block composition was 35% dry ingredients added to a liquid mixture with 3%-5% HVO, with the balance being molasses. The resulting final moisture level after dehydration was about 2.5%. To facilitate the quantitative measurements of slump, the material was formed into a cone with a height of about 8.0 cm and a base diameter of 6.9 cm. FIGS. 4A and 4B show quantitative results of slump tests for block material cone samples made with cane molasses. To accelerate the cold flow action for observation, the samples were incubated at a continuous temperature of 120° F. Slump was observed over a period of 6 hours of such accelerated incubation. As can be seen in FIG. 4A, the slumping from an initial block height of 8.0 cm was greatest for the blocks with 1.0% CaO and no CaO. The data show higher levels of slump reduction with higher percentages of CaO. FIG. 4B shows the same results, expressed by a height percentage change with time.

Figure 4C:
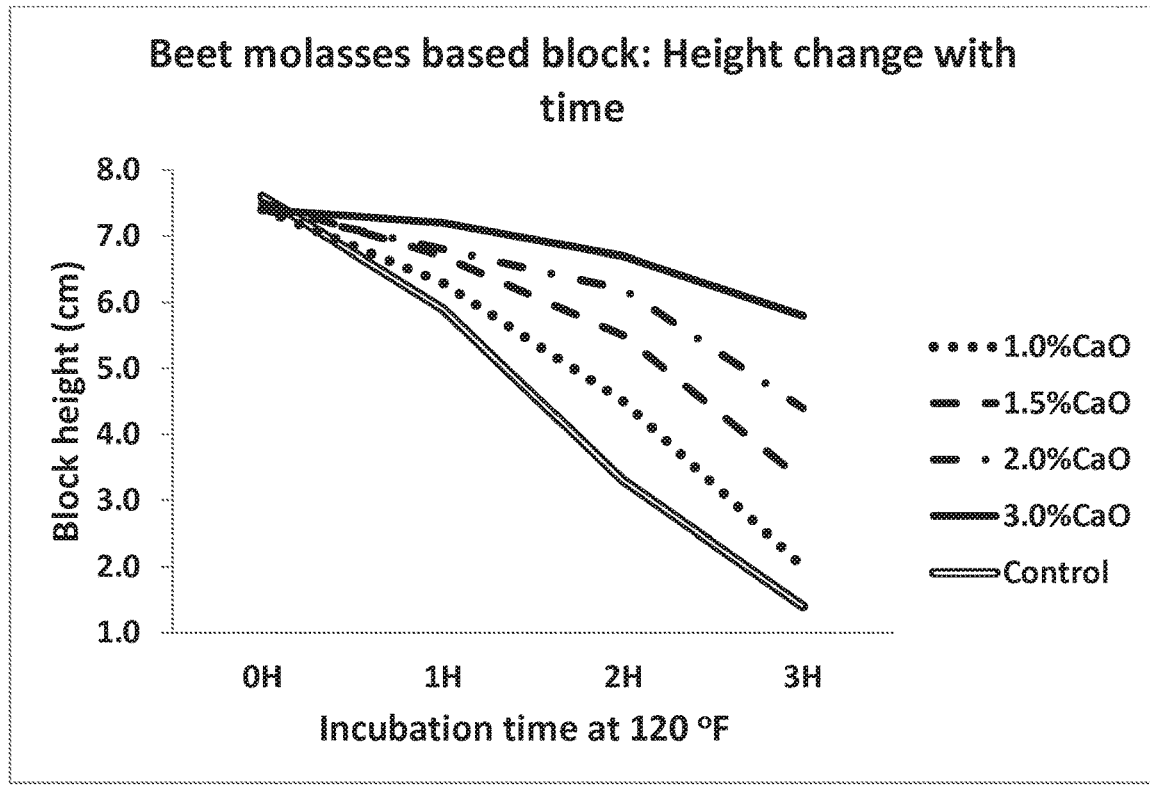
Figure 4D:
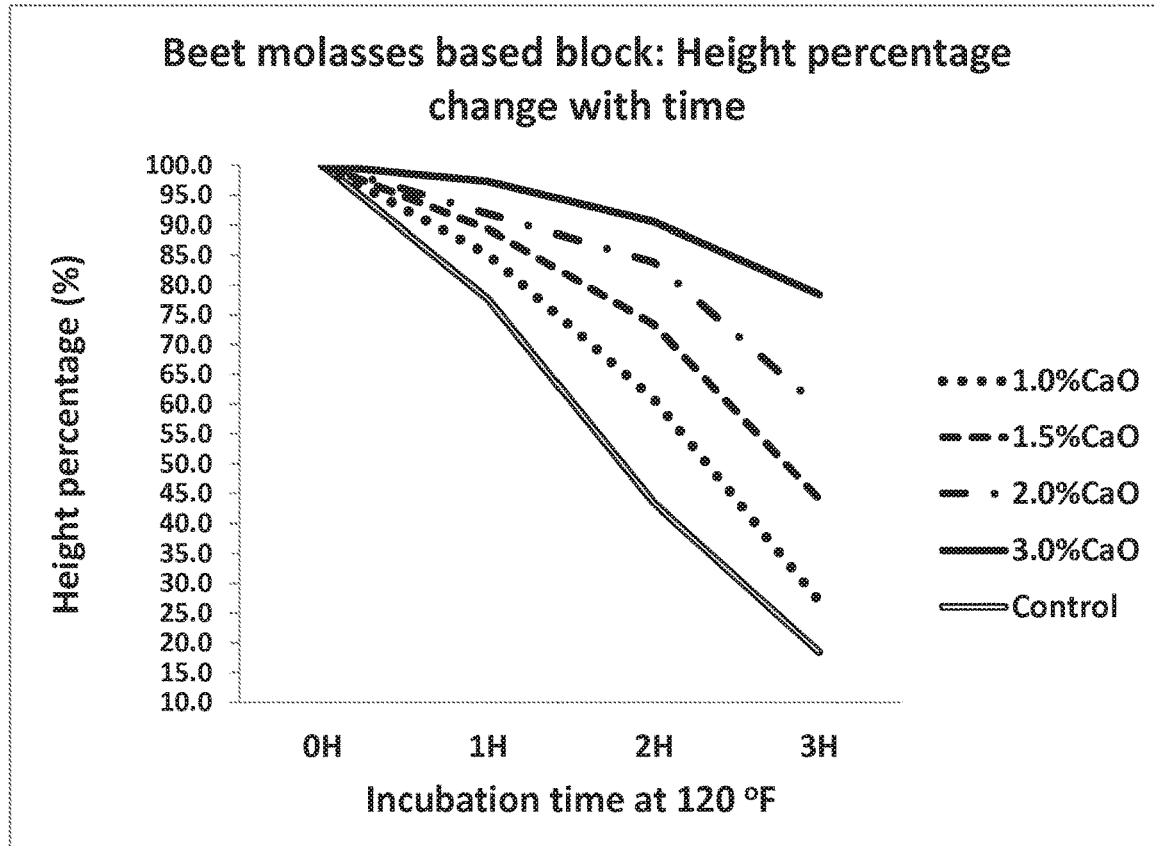

FIGS. 4C and 4D show quantitative results of slump tests for low moisture blocks made with beet molasses. The same composition and cone shape was used as for the samples of FIGS. 4A and 4B. Again, CaO was added to block mixes after dehydration, in percentages of 1%, 1.5%, 2% and 3% and there was a control low moisture block to which no CaO was added. To accelerate the cold flow action for observation, the samples again were incubated at a continuous temperature of 120° F. Slump was observed over a period of 3 hours of accelerated incubation. As can be seen in FIG. 4C, the slumping from an initial cone height of about 7.5 cm (6.8 cm base diameter of cone) was greatest for the block with no CaO. FIG. 4D shows the same results expressed by a height percentage change with time. Here the slumping occurred faster than with the cane molasses samples. The pattern of higher levels of slump reduction with the higher levels of CaO is also evident with these beet molasses samples.

FIG. 5 shows further data on another set of samples, to which 1.5% by weight of the total product of CaO and of various other block cold flow resistance candidate chemicals, including $Ca(OH)_2$, $MgSO_4$, $Na_2SO_4$, $CaSO_4$, R—MgO (reactive magnesium oxide, i.e., essentially amorphous magnesia with low lattice energy, made at low temperatures and finely ground, including highly reactive versions, e.g., Light-burn of caustic-calcined MgO from TecEco Pty Ltd., of Tasmania, Australia), $CaCl_2$, $CaCO_3$, $MgCl_2$ was added after dehydration, as well as a control block with no candidate substance added. The same composition and cone shape was used as for the samples of FIGS. 4A-4D. FIG. 5 shows decreasing height measured from an original height in the range of 7.2-7.5 cm (varying by sample) and slumping as percentage decrease in height. These samples also were incubated at 120 degrees F. and measurements taken at the start and at 2, 3 and 4 hours from the start. The data show that CaO is the most effective of the candidate chemicals tested at 1.5% by weight. R—MgO was the next best alternative. The other candidate chemicals showed little difference as compared to the control, or even worse slumping than the control.

Figure 6A:
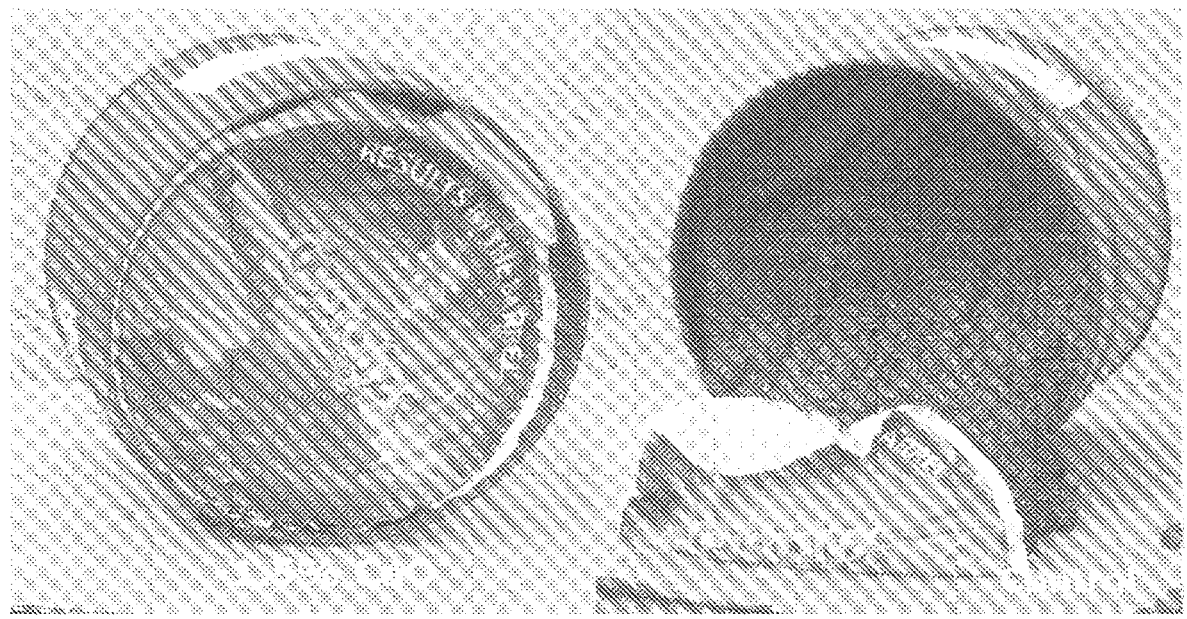
FIGS. 6A and 6B show low moisture block material in tipped containers, left in sun and in the shade, respectively, in 90 degrees ambient temperature, and the results of cold flow with 1.5% CaO and control block with no CaO.
Figure 6B:
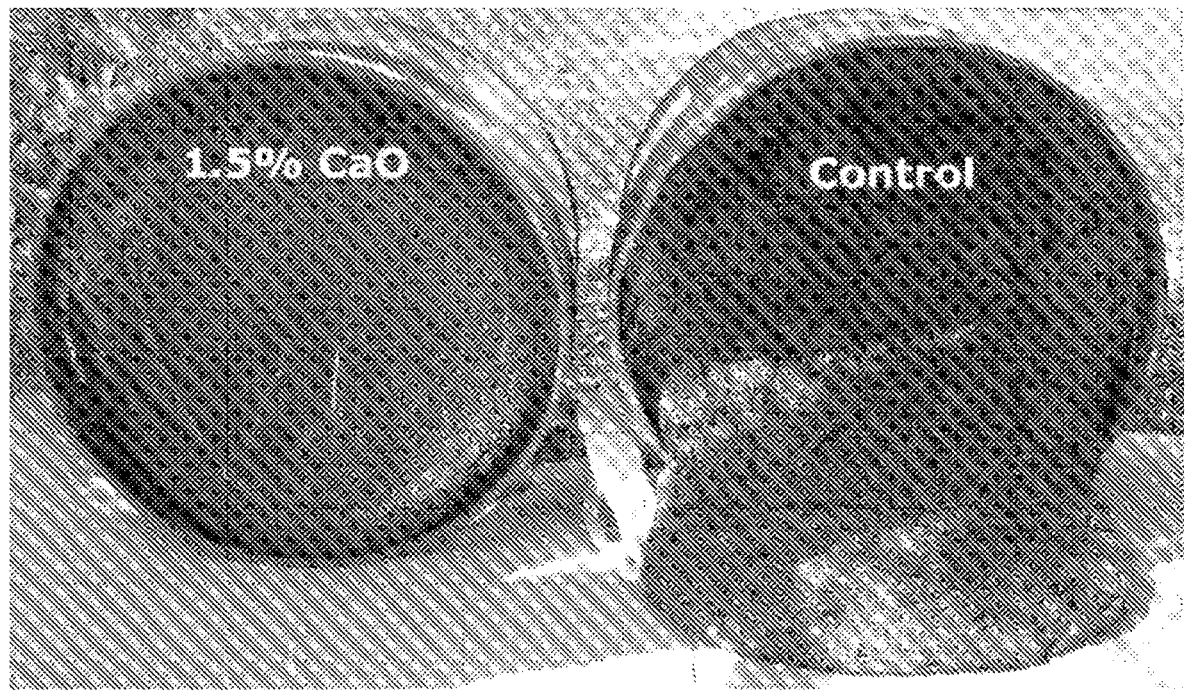

In contrast to the laboratory data, FIGS. 6A and 6B show the effects of adding an agent to reduce cold flow in something more like a conventional block in a container in a field setting. FIGS. 6A and 6B show low moisture block material in tipped containers, left in sun and in the shade, respectively, in 90 degrees ambient temperature, and the results of cold flow with 1.5% CaO and a control block with no CaO. As can be seen the block material without the added CaO shows significant cold flow, causing escape from the container.

Addition of CaO: Containers. The general formula for low moisture blocks in which cold flow can be resisted by adding CaO is: cane molasses and/or beet molasses based liquids; cane molasses and beet molasses mixed liquids which include oil/fat; or any liquid containing sugars (mono-, di- or poly saccharides), in each case to which dry nutrients are added. The typical proportions of ingredients are: cane/beet molasses: 40% or more; oil/fat: 20% or less; and other liquids: 40% or less (all weight percentages of mixture before dehydration is applied). Alternatives to the cane or beet molasses include other molasses-like liquids, such as condensed separator by-products (CSB), separator molasses solubles (SMS), soy molasses or other similar molasses, lactose whey or other liquid sources of mono-, di- or polysaccharides. Accordingly, as used herein molasses-like liquids means any of the preceding materials or functional equivalents.

The CaO added is in the form of powder (Mesh 20 to 400) (obtainable from Mississippi Lime Company, of St. Louis, MO), or any chemical containing CaO as a major ingredient, and is mixed by any suitable mixer or blender. While the above results suggest that even greater cold flow resistance will occur with an increased weight percentage amount of CaO, the cost of the CaO and the desire not to overweight a feed product with it dictate finding a CaO amount range that is sufficient to resist cold flow to the desired extent for an application and expected temperatures. Based on the above results, a percentage amount of CaO from 0.1% to 10% by weight of the total product after the dry ingredients and CaO are added to the dehydrated molasses and other ingredients is viewed as appropriate. A percentage amount of CaO by weight of the total product after the dry ingredients and CaO are added to the dehydrated molasses and other ingredients also may be selected from the ranges: from 0.5% to 8%, from 0.5% to 3%, from 1.0% to 3%, or from 1.5% to 3%.

The resistance to cold flow in low moisture blocks found to result from the addition of CaO is unexpected and not fully explained. Although DeSantis (U.S. Pat. No. 4,016,296) mentions calcium oxide as a possible hard metallic soap former for that poured/chemical block, DeSantis contemplates a saponification process. DeSantis describes that as occurring with the reaction of a hard metallic soap former with a fatty acid soap former. But DeSantis also calls for use of water absorbent clays and water binding agents. Saponification occurs when an alkaline metal hydroxide, e.g., X(OH)n is caused to react with fatty acids and/or fat. This requires a higher temperature, e.g. over 200° F., to make a fast reaction and achieve desired molecule formation. So DeSantis appears to be promoting different hardening methods and reactions, in particular, methods that assume significant available water is present. Because the CaO added in the presently described process is added only after dehydration, the water level available to the added CaO is very low. Without enough water/moisture, CaO could not sufficiently react to form $Ca(OH)_2$ to make soap. Thus, in the present low moisture block process and formulation, it is doubtful that any meaningful amount of saponification can occur.

Vinci (U.S. Pat. No. 5,236,717) also contemplates use of calcium oxide in a poured/chemical block. Vinci refers to a reaction that produces a "dry fatty acid calcium salt product" in granular form. The granules may be used in a mixture with molasses to make a block, but only after phosphoric acid is added, which Vinci seems to use as a thickener for an aqueous suspension of ingredients. Thus, Vinci is not working with a dehydrated mixture or a low moisture block with his addition of CaO.

Bachmeier (U.S. Pat. No. 6,793,947) mentions calcium oxide along with magnesium oxide as a hardener for a compressed block. Bachmeier contemplates a mixture, including the calcium oxide or magnesium oxide as a hardener, with 25% to 40% moisture content as an input to the compression step. Again, the calcium oxide of Bachmeier is not functioning in a dehydrated mixture as in the present low moisture block process and formulation. Further, Bachmeier uses compression for block production.

The prior art suggests that the substances such as $MgSO_4$ or $NaSO_4$ added for block hardening in an aqueous mixture are binding water by crystallization. With the present addition of CaO to a dehydrated mixture, with very little free water, it is believed different reactions are involved, than merely: $CaO+H_2O \rightarrow Ca(OH)_2$.

Other evidence has been developed suggesting the reactions in prior art that used CaO in a non-low moisture block are different than what occurs in applicant's low moisture block. The graph of FIG. 7A indicates that the cold flow resistance effect of CaO treated blocks containing no HVO was better than in a control containing no HVO and with no CaO. Getting this cold flow resistance result in blocks with no HVO implies the cold flow reduction effect was not due to soap formation. Thus, it appears that by adding CaO after dehydration, saponification from HVO and Ca(OH)$_2$ reaction is not a primary reaction; rather, a reaction more directly connected with reducing cold flow characteristics of the crystallizing sugars appears to be involved. Some evidence that the addition of CaO in applicant's process is not causing significant water reduction appears in moisture measurements showing that moisture content of block material changed little after addition of CaO. In particular moisture content was not lowered, as much as would have been expected if water-eliminating reactions occurred. In three test batches with differing levels of dehydration, with each batch having a control portion with no CaO and a portion to which 1.5% CaO was added, the following was observed:

| Batch | Control H$_2$O % | H$_2$O % after CaO Added | Expected H$_2$O % w/Total Rx (0.7 reduction expected) |
|---|---|---|---|
| A | 2.56 | 2.78 | 1.86 |
| B | 2.03 | 1.80 | 1.33 |
| C | 3.50 | 3.46 | 2.80 |

Figure 7A:
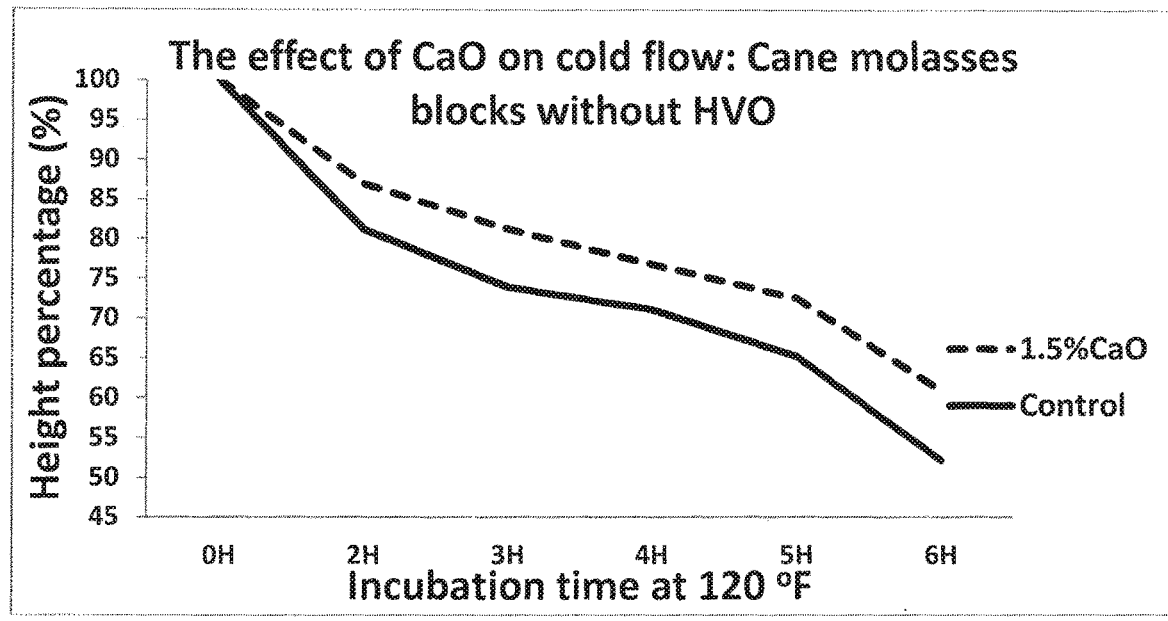
FIG. 7A is a graph comparing cold flow effects in cane molasses blocks without hydrolyzed vegetable oils and with 1.5% CaO added vs. no CaO.
Figure 7B:
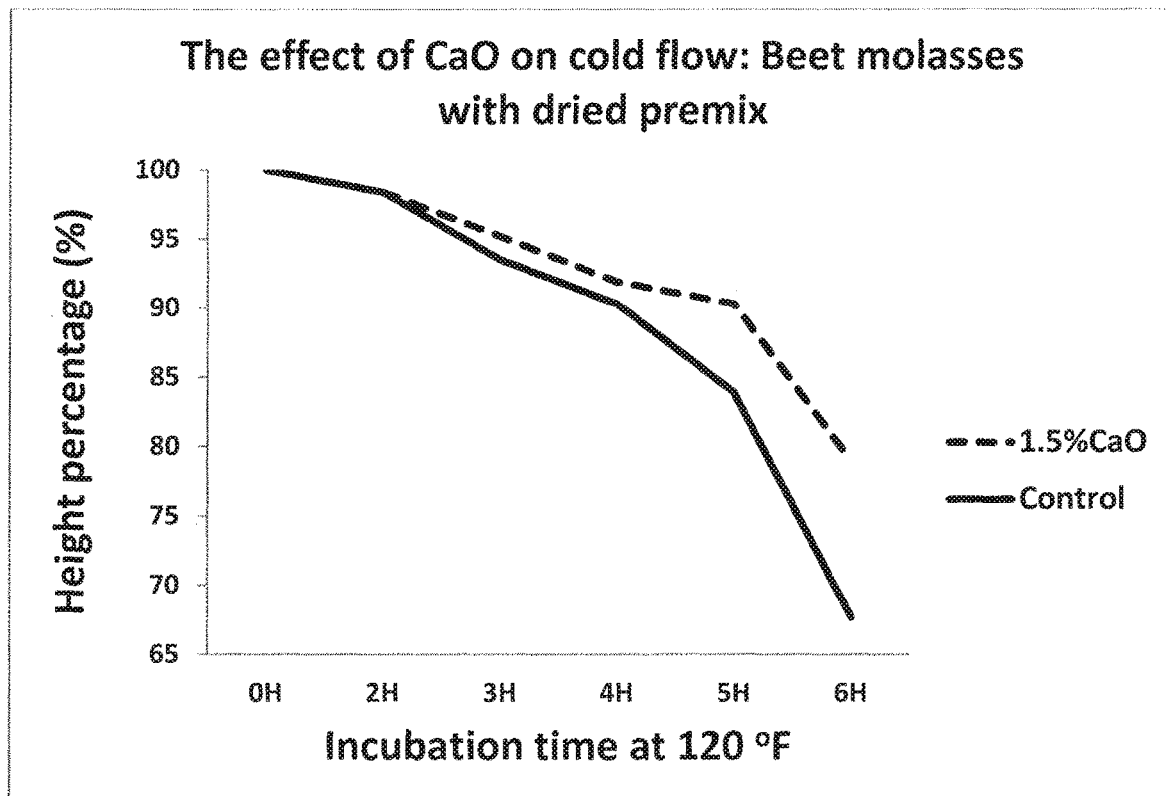
FIG. 7B is a graph comparing cold flow effects on in-plant cooked beet molasses blocks with dried premix and with 1.5% CaO added vs. no CaO.

The graph of FIG. 7B compares cold flow reduction effects in blocks made with dry ingredients that were dehydrated to a moisture level of 2%. The CaO treated block had better cold flow resistance than a control with no CaO, even though both had very little moisture that might be used for a hydrated lime, concrete-forming like reaction or for water-binding with no reaction.

Figure 7C:
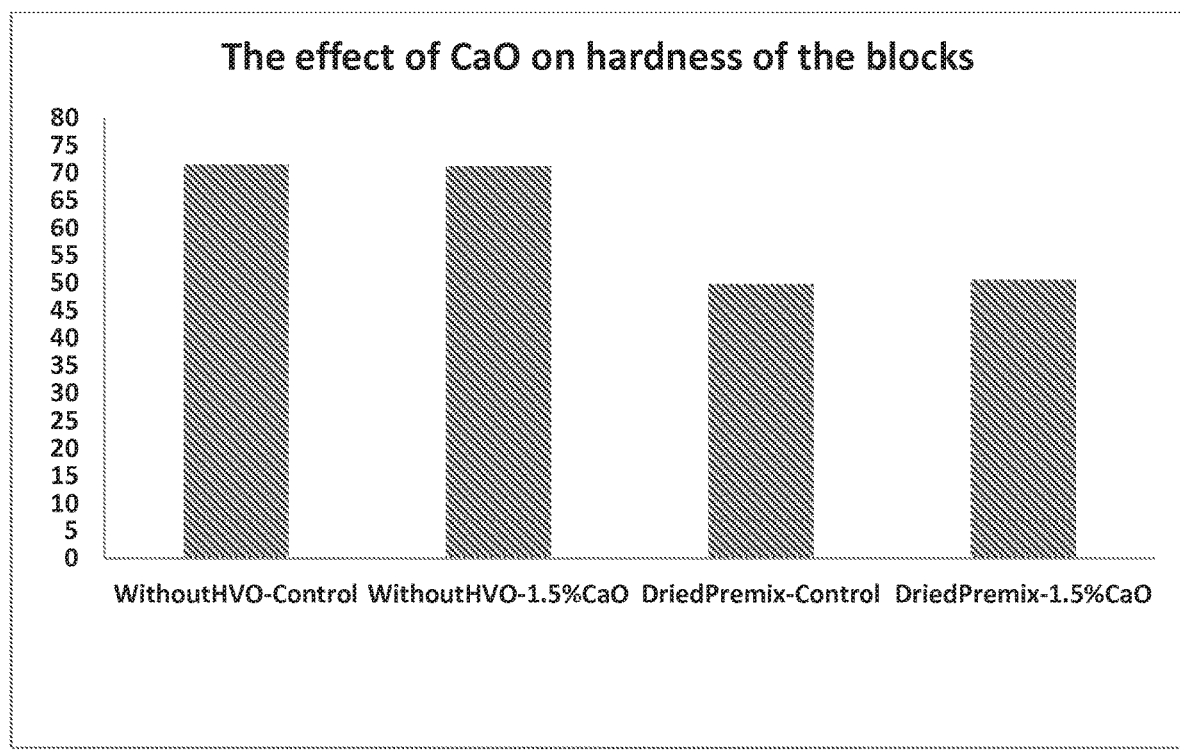
FIG. 7C is a graph comparing hardness of the cane molasses blocks without hydrolyzed vegetable oils and the in-plant cooked beet molasses blocks with dried premix and with 1.5% CaO added vs. no CaO, which are the subject of FIGS. 7A and 7B.

The chart of FIG. 7C further indicates that in the blocks of FIGS. 7A and 7B, the addition of CaO does not affect the hardness of the block as measured by a Shore D durometer, although the CaO addition did cause the cold flow resistance effect.

Examples. The following are two specific examples of low moisture block formulations that include CaO for resistance to cold flow.

Example 1: The following were mixed:

| Ingredients | Percentage (Wet basis) | Percentage (Dry Basis) |
|---|---|---|
| Molasses Cane Wet | 52.00 | 47.44 |
| Molasses CSB Wet | 17.00 | 13.81 |
| Soybean Meal | 20.00 | 25.00 |
| Hydrolyzed Vegetable Oil (HVO) | 3.80 | 4.75 |
| Dical Phosphate 21% Bulk | 2.50 | 3.12 |
| Limestone | 2.50 | 3.12 |
| Calcium Oxide (CaO) | 1.20 | 1.50 |
| Trace-Mineral-Vitamin-Premix | 1.00 | 1.25 |
| Total | 100.00 | 100.00 |

The CaO was added after dehydration.

Example 2: The following were mixed:

| Ingredients | Percentage (Wet basis) | Percentage (Dry Basis) |
|---|---|---|
| Molasses Beet Wet | 55.00 | 51.69 |
| Molasses CSB Wet | 14.00 | 10.96 |
| Soybean Meal | 16.00 | 19.28 |
| Hydrolyzed Vegetable Oil (HVO) | 3.50 | 4.22 |
| Dical Phosphate 21% Bulk | 3.00 | 3.61 |
| Limestone | 3.50 | 4.22 |
| Urea Feed Grade | 2.80 | 3.37 |
| Calcium Oxide (CaO) | 1.25 | 1.51 |
| Trace-Mineral-Vitamin-Premix | 0.95 | 1.14 |
| Total | 100.00 | 100.00 |

Again the CaO was added after dehydration.

The block material of the preceding examples and other formulations may be placed in a biodegradable container. For example, the biodegradable container is made from ground straw and wood fiber, which is coated with a soy flour solution for binding and is pressed and molded, or a is container as disclosed in U.S. Pat. No. 6,337,097 or 6,561,787.

Alternatives to CaO. The data in FIG. 5, suggest that reactive magnesium oxide, R—MgO, may be a reasonable substitute for CaO to reduce cold flow in some applications. R—MgO appears to provide somewhat less cold flow reduction than CaO, but could be adequate in some environments. Based on chemical similarities, the following additional oxides are reasonably expected also to provide cold flow resistance similar to that provided by CaO and R—MgO: ZnO (Zinc Oxide), MnO (Manganese Oxide), FeO (Ferrous Oxide), CuO (Cupric Oxide), CuO$_2$ (Cuprous Oxide). The various alternatives to CaO would be applied at rates of 0.1 to 10% of the agent by weight, at least for those feeding situations where the extreme ends of these ranges do not, for the particular animals that consume the block and the particular agent, pose nutritional issues. For example, sheep are generally considered sensitive to excess copper levels, although it is also viewed as an essential key trace nutrient.

The following is a specific example of a low moisture block formulation that includes R—MgO.

Example 3: The following were mixed:

| Ingredients | Percentage (Wet basis) | Percentage (Dry Basis) |
|---|---|---|
| Molasses Cane Wet | 55.00 | 50.25 |
| Molasses CSB Wet | 15.00 | 12.20 |
| Soybean Meal | 19.00 | 23.78 |
| Hydrolyzed Vegetable Oil (HVO) | 3.60 | 4.51 |
| Dical Phosphate 21% Bulk | 3.00 | 3.75 |
| Limestone | 2.40 | 3.00 |
| Reactive Magnesium Oxide (R—MgO) | 1.20 | 1.50 |
| Trace-Mineral-Vitamin-Premix | 0.80 | 1.00 |
| Total | 100.00 | 100.00 |

The R—MgO was added after dehydration.

CaO and R—MgO Blends. Certain additional tests were run to study the use of R—MgO and R—MgO blended with CaO, with the following results.

Study 1. Effects of CaO, R—MgO, and a mix of the two at 1:1, with an inclusion rate in a low moisture block of 1.5% w/w. This test had two purposes: (a) to demonstrate that the effects of the CaO, R—MgO, and a mix of the two are not only due to any water reaction (limited by the low moisture level), but also involve other reactions; and (b) to demonstrate that R—MgO and similar metal oxide chemicals also act like CaO to resist cold flow.

Test description: The following tests investigated the effects of CaO, R—MgO, and mix of the two at 1:1, with an inclusion rate in a low moisture block of 1.5% w/w. A control with no CaO or R—MgO was also used. The test "blocks", formed as cones as in the prior tests, were made in a laboratory. Each weighed 340 grams, with a height before incubation at about 7.5 cm. The incubation temperature to test for cold flow was at 120° F. The percentage of original height after three hours incubation is in the table below.

| Test No. | Control | CaO | Mix CaO/R—MgO | R—MgO |
|---|---|---|---|---|
| 1- Cooked beet molasses only (less than 0.5% total water) | 46.1 | 63.0 | 57.2 | 55.3 |
| 2 - Cooked molasses with dried premix (less than 0.5% total water) | 41.2 | 58.5 | 56.6 | 54.1 |
| 3 - Cooked molasses with normal premix (3% or less total water) | 45.7 | 58.9 | 58.3 | 57.3 |

As can be seen, the CaO, R—MgO, and a mix of the two at 1:1 all showed improved cold flow inhibition relative to the control, in a test block with low moisture.

Study 2. Effects of CaO, R—MgO, and a mix of the two at 1:1, with an inclusion rate in a low moisture block of 1.5% w/w. This test had the purpose to demonstrate that the effects of the chemicals used are not only due to the limited water reaction, but also involve other reactions, especially here reactions with sugar.

Test description: The following tests investigated the effects of CaO, R—MgO, and a mix of the two at 1:1; the inclusion rate for each test is 1.5% w/w. The blocks were made in a laboratory using table sugar (sucrose). The sucrose was melted at 186° C., cooled down to 130° C. and mixed with respective compositions. The mixture was poured into cups to make 940 gram "blocks", in the shape of cones with a height before incubation at about 9.5 cm. A control with no CaO or R—MgO was also used. The incubation temperature was at 140° F. due to the larger size. The height percentage (of original cone height) after six hours incubation is in the table below.

| Control | CaO | Mix CaO/R—MgO | R—MgO |
|---|---|---|---|
| 38.9 | 57.6 | 58.2 | 44.6 |

As can be seen, the CaO, R—MgO, and a mix of the two at 1:1 all showed improved cold flow inhibition relative to the control, in a test block made with only sugar available, with essentially no moisture.

The information and examples described herein are for illustrative purposes and are not meant to exclude any derivations or alternative methods that are within the conceptual context of the invention. It is contemplated that various deviations can be made to this embodiment without deviating from the scope of the present invention. Accordingly, it is intended that the scope of the present invention be dictated by the appended claims rather than by the foregoing description of this embodiment.

The invention claimed is:

1. A method of forming a low moisture block with cold flow resistance comprising:
  subjecting a feed composition containing liquids comprising one or more of cane molasses, beet molasses, condensed separator by-products (CSB), separator molasses solubles (SMS), soy molasses, molasses, lactose whey, liquid sources of mono-, di- or polysaccharides, and any combination thereof to mixing to form a first mixture;
  dehydrating the first mixture to less than about 2.0% moisture to form a second mixture;
  adding to the second mixture i) or more feed ingredients in dry ingredient form and ii) a composition comprising at least one of CaO, reactive MgO, ZnO, MnO, FeO, CuO, $CuO_2$ or combinations thereof to form a third mixture, wherein the third mixture comprises between 10% to 50% by weight of the one or more feed ingredients and between 0.1% to 10% by weight of the composition;
  wherein the addition of the composition is performed before sugar crystallization occurs and forms the low moisture block with cold flow resistance.

2. The method of claim 1, wherein the step of dehydrating comprises heating to between 250° F. and 300° F. and the application of a vacuum.

3. The method of claim 1, wherein the liquids are condensed separator by-products (CSB), separator molasses solubles (SMS), soy molasses, lactose whey, or mixtures thereof.

4. The method of claim 1 further comprising adding hydrolyzed vegetable oils to the liquids in amount of 0% to 20% by weight of the first mixture.

5. The method of claim 1, wherein the liquids are cane molasses beet molasses, or mixtures thereof.

6. The method of claim 1 wherein the composition comprises 0.5% to 8.0% by weight of the third mixture.

7. The method of claim 1 wherein the composition comprises 0.5% to 3.0% by weight of the third mixture.

8. The method of claim 1 wherein the composition comprises 1.5% to 3% by weight of the third mixture.

9. The method of claim 1, wherein the composition comprises reactive MgO, and wherein the composition optionally comprises at least one of CaO, ZnO, MnO, FeO, CuO, $CuO_2$ or combinations thereof.

10. The method of claim 1, wherein the composition is added to the second mixture when it is at a temperature in the range of 145° F. to 180° F.

11. A method of forming a low moisture block with cold flow resistance comprising:
  preparing a feed composition containing liquids comprising one or more of cane molasses, beet molasses, condensed separator by-products (CSB), separator molasses solubles (SMS), soy molasses, molasses, lactose whey, liquid sources of mono-, di- or polysaccharides, and any combination thereof;
  dehydrating the feed composition to less than about 2.0% moisture to form a dehydrated mixture;
  adding to the dehydrated mixture i) or more feed ingredients in dry ingredient form and ii) a composition comprising CaO, reactive MgO or combinations thereof to form a resulting mixture, wherein addition of the composition is performed before sugar crystallization,
  wherein the one or more feed ingredients in dry ingredient form comprises between 10% to 50% by weight of the resulting mixture; and
  wherein the composition comprises between 0.1% to 10% by weight of the resulting mixture.

12. The method of claim 11 wherein the composition comprises an amount within the range 0.5% to 8.0% by weight of the resulting mixture.

13. The method of claim 11 wherein the composition comprises an amount within the range 0.5% to 3.0% by weight of the resulting mixture.

14. The method of claim 11 wherein the composition comprises an amount within the range 1.5% to 3.0% by weight of the resulting mixture.

15. The method of claim 1, wherein the composition comprises reactive MgO, and wherein the composition optionally comprises at least one of CaO, ZnO, MnO, FeO, CuO, $CuO_2$ or combinations thereof.

16. The method of claim 1, wherein the composition is reacted with the dehydrated mixture to form the low moisture block.

17. The method of claim 1, wherein the feed ingredients in dry ingredient form are selected from the group consisting of protein meal, vitamin, phosphate, urea, limestone, medication, and any combination thereof.

18. The method of claim 15 wherein the composition comprises reactive MgO at 0.5% to 8.0% by weight of the resulting mixture.

19. The method of claim 15 wherein the composition comprises reactive MgO at 0.5% to 3.0% by weight of the resulting mixture.

20. The method of claim 15 wherein the composition comprises reactive MgO at 1.5% to 3% by weight of the resulting mixture.

\* \* \* \* \*